(12) United States Patent
Sun

(10) Patent No.: US 11,276,069 B2
(45) Date of Patent: Mar. 15, 2022

(54) RISK PAYMENT PROCESSING METHOD AND APPARATUS, AND DEVICE

(71) Applicant: ADVANCED NEW TECHNOLOGIES CO., LTD., Grand Cayman (KY)

(72) Inventor: Yuxing Sun, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 17/306,637

(22) Filed: May 3, 2021

(65) Prior Publication Data

US 2021/0256527 A1  Aug. 19, 2021

Related U.S. Application Data

(63) Continuation of application No. PCT/CN2020/073753, filed on Jan. 22, 2020.

(30) Foreign Application Priority Data

Feb. 26, 2019 (CN) .......................... 201910140872.0

(51) Int. Cl.
   *G06Q 20/40* (2012.01)
   *G06Q 20/08* (2012.01)
(52) U.S. Cl.
   CPC ..... *G06Q 20/4016* (2013.01); *G06Q 20/0855* (2013.01)
(58) Field of Classification Search
   CPC .............................. G06Q 20/40; G06Q 20/08
   See application file for complete search history.

(56) References Cited

U.S. PATENT DOCUMENTS

| 7,014,107 | B2 | 3/2006 | Singer et al. |
| 7,349,871 | B2 | 3/2008 | Labrou et al. |

(Continued)

FOREIGN PATENT DOCUMENTS

| CN | 102096872 A | 6/2011 |
| CN | 102789607 A | 11/2012 |

(Continued)

OTHER PUBLICATIONS

Search Report for Taiwanese Application No. 108132764 dated Jul. 13, 2020.

(Continued)

*Primary Examiner* — Scott S Trotter

(57) ABSTRACT

A payment processing method comprises: receiving, by a transaction platform, a payment request, wherein the payment request indicates that a protocol payment is performed for a current payment using a third-party payment account; initiating, by the transaction platform, if the third-party payment account is determined as having a risk, a security verification request to a third-party payment service party, to trigger the third-party payment service party to execute a security verification for the current payment to generate a security verification result; obtaining, by the transaction platform, the security verification result from the third-party payment service party; and executing, by the transaction platform, a current payment process for the current payment according to the security verification result. The risk is reduced in the payment process by an identity verification of a third-party payment service to ensure payment security and improve payment experience.

14 Claims, 5 Drawing Sheets

(56) References Cited

U.S. PATENT DOCUMENTS

| | | | |
|---|---|---|---|
| 7,954,706 B2 * | 6/2011 | Calabrese | G06Q 20/325 |
| | | | 235/380 |
| 8,423,466 B2 | 4/2013 | Lanc | |
| 8,875,990 B2 | 11/2014 | Bishop et al. | |
| 9,443,237 B2 | 9/2016 | Mckelvey et al. | |
| 9,727,862 B2 | 8/2017 | O'connell et al. | |
| 9,898,729 B2 | 2/2018 | Aabye et al. | |
| 10,692,057 B1 * | 6/2020 | Daruwalla | G06Q 40/02 |
| 10,902,402 B2 * | 1/2021 | Song | G06Q 20/405 |
| 2006/0107037 A1 | 5/2006 | Lincoln et al. | |
| 2006/0235795 A1 | 10/2006 | Johnson et al. | |
| 2015/0019443 A1 | 1/2015 | Sheets et al. | |
| 2015/0186880 A1 | 7/2015 | Zhang | |
| 2016/0117681 A1 | 4/2016 | Jiao et al. | |
| 2016/0224971 A1 | 8/2016 | Aabye et al. | |
| 2016/0292678 A1 | 10/2016 | Lai | |
| 2017/0262828 A1 | 9/2017 | Luciani | |
| 2018/0189783 A1 | 7/2018 | Flurscheim et al. | |
| 2018/0308100 A1 * | 10/2018 | Haukioja | G06N 5/04 |
| 2019/0172048 A1 | 6/2019 | Hammad | |
| 2020/0053560 A1 | 2/2020 | Lopez | |

FOREIGN PATENT DOCUMENTS

| | | |
|---|---|---|
| CN | 103093341 A | 5/2013 |
| CN | 203299885 U | 11/2013 |
| CN | 103489095 A | 1/2014 |
| CN | 104408610 A | 3/2015 |
| CN | 104616137 A | 5/2015 |
| CN | 104639566 A | 5/2015 |
| CN | 105556553 A | 5/2016 |
| CN | 103530764 A | 1/2017 |
| CN | 106934606 A | 7/2017 |
| CN | 107153961 A | 9/2017 |
| CN | 107808289 A | 3/2018 |
| CN | 108038686 A | 5/2018 |
| CN | 110060035 A | 7/2019 |
| JP | 2009534741 A | 9/2009 |
| JP | 4509930 B2 | 7/2010 |
| TW | M549911 U | 10/2017 |
| TW | M550856 U | 10/2017 |

OTHER PUBLICATIONS

Written Opinion and International Search Report for PCT Application No. PCT/CN2020/073753 dated Apr. 21, 2020.
First Search Report for Chinese Application No. 201910140872.0 dated May 26, 2020.
International Preliminary Report on Patentability Chapter I for PCT Application No. PCT/CN2020/073753 dated Sep. 10, 2021.

* cited by examiner

RISK PAYMENT PROCESSING METHOD AND APPARATUS, AND DEVICE

CROSS-REFERENCE TO RELATED APPLICATION

This application is a continuation application of International Patent Application No. PCT/CN2020/073753, filed with the China National Intellectual Property Administration (CNIPA) on Jan. 22, 2020, which is based on and claims priority to and benefits of Chinese Patent Application No. 201910140872.0, filed with the CNIPA on Feb. 26, 2019. The entire content of all of the above-identified applications is incorporated herein by reference.

TECHNICAL FIELD

This application relates to the field of Internet technologies, and in particular, to methods, apparatuses, and devices for processing risky payments.

BACKGROUND

With the development of Internet technologies, people are increasingly using various network-based services, and also increasingly using mobile payment methods to perform payments, such as various electronic wallets. Online shopping transaction platforms can access electronic wallets provided by various service parties. When a user needs to perform a payment, the user can select one of the electronic wallet to perform the payment as required. However, such a payment processing manner may have a risk. How to ensure security against the possible risk without affecting payment experience of the user becomes a technical problem that needs to be resolved urgently.

SUMMARY

To overcome problems existing in the related art, embodiments of this specification provide a method, apparatus, and device for processing risky payments.

According to a first aspect of the embodiments of this specification, a payment processing method is provided, which includes:

receiving a payment request, where the payment request indicates that a protocol payment is performed for a current payment using a third-party payment account;

initiating, if it is determined that the third-party payment account has a risk, a security verification request to a third-party payment service party, to trigger the third-party payment service party to execute a security verification for the current payment; and obtaining a security verification result from the third-party payment service party and executing a payment process according to the security verification result.

In an embodiment, the method further includes:

executing a protocol payment procedure to complete a current payment process if it is determined that the third-party payment account does not have a risk.

In an embodiment, the security verification request carries payment information of the current payment, for the third-party payment service party to trigger a deduction procedure using the payment information after it is determined that the third-party payment account does not have a risk.

In an embodiment, the executing a payment process according to the security verification result includes:

prohibiting the current payment if the security verification result indicates that the security verification for the current payment fails.

In an embodiment, the initiating a security verification request to a third-party payment service party, to trigger the third-party payment service party to execute a security verification for the current payment includes:

invoking a security verification interface provided by the third-party payment service party, obtaining page link information of the third-party payment service party, and accessing a security verification page of the third-party payment service party according to the page link information, for the third-party payment service party to execute the security verification for the current payment through the security verification page.

In an embodiment, the initiating a security verification request to a third-party payment service party, to trigger the third-party payment service party to execute a security verification for the current payment includes:

triggering a third-party payment application, for the third-party payment application to jump to a security verification page and to execute the security verification for the current payment through the security verification page.

According to a second aspect of the embodiments of this specification, a payment processing method is provided, which includes:

receiving a security verification request sent from a transaction platform side for a current payment, where the security verification request is initiated by the transaction platform side after a user performs a protocol payment using a third-party payment account and determines that the third-party payment account has a risk;

executing a security verification procedure for the current payment; and determining a verification result after execution of the security verification procedure and sending the verification result to the transaction platform side.

According to a third aspect of the embodiments of this specification, a payment processing apparatus is provided, which includes:

a receiving module, configured to receive a payment request, where the payment request indicates that a protocol payment is performed for a current payment using a third-party payment account;

a security verification module, configured to initiate, if it is determined that the third-party payment account has a risk, a security verification request to a third-party payment service party, to trigger the third-party payment service party to execute a security verification for the current payment; and a payment processing module, configured to obtain a security verification result from the third-party payment service party and execute a payment process according to the security verification result.

In an embodiment, the payment processing module is further configured to:

execute a protocol payment procedure to complete current payment processing if it is determined that the third-party payment account does not have a risk.

In an embodiment, the security verification request carries payment information of the current payment, for the third-party payment service party to trigger a deduction procedure using the payment information after it is determined that the third-party payment account does not have a risk.

In an embodiment, the payment processing module is further configured to:

prohibit the current payment if the security verification result indicates that the security verification for the current payment fails.

In an embodiment, the security verification module is further configured to:

invoke a security verification interface provided by the third-party payment service party, obtain page link information of the third-party payment service party, and access a security verification page of the third-party payment service party according to the page link information, for the third-party payment service party to execute the security verification for the current payment through the security verification page.

In an embodiment, the security verification module is further configured to:

trigger a third-party payment application, for the third-party payment application to jump to a security verification page and to execute the security verification for the current payment through the security verification page.

According to a fourth aspect of the embodiments of this specification, a payment processing apparatus is provided, which includes:

a receiving module, configured to receive a security verification request sent from a transaction platform side for a current payment, where the security verification request is initiated by the transaction platform side after a user performs a protocol payment using a third-party payment account and determines that the third-party payment account has a risk;

a security verification module, configured to execute a security verification procedure for the current payment; and a sending module, configured to determine a verification result after execution of the security verification procedure and send the verification result to the transaction platform side.

According to a fifth aspect of the embodiments of this specification, a computer device is provided, which includes a memory, a processor, and a computer program stored in the memory and executable on the processor, where the processor executes the program to implement the embodiment of the payment processing method.

According to a sixth aspect of the embodiments of this specification, a payment processing method is provided. The method comprises: receiving, by a transaction platform, a payment request, wherein the payment request indicates that a protocol payment is performed for a current payment using a third-party payment account; initiating, by the transaction platform, if the third-party payment account is determined as having a risk, a security verification request to a third-party payment service party, to trigger the third-party payment service party to execute a security verification for the current payment to generate a security verification result; obtaining, by the transaction platform, the security verification result from the third-party payment service party; and executing, by the transaction platform, a current payment process for the current payment according to the security verification result.

According to a seventh aspect of the embodiments of this specification, a payment processing system is provided. The system comprises one or more processors and a non-transitory computer-readable storage medium storing instructions executable by the one or more processors to cause the system to perform operations comprising: receiving, by a processor of a transaction platform, a payment request, wherein the payment request indicates that a protocol payment is performed for a current payment using a third-party payment account; initiating, by the processor of the transaction platform, if the third-party payment account is determined as having a risk, a security verification request to a third-party payment service party, to trigger a processor of the third-party payment service party to execute a security verification for the current payment to generate a security verification result; obtaining, by the processor of the transaction platform, the security verification result from the third-party payment service party; and executing, by the processor of the transaction platform, a current payment process for the current payment according to the security verification result.

According to an eighth aspect of the embodiments of this specification, a non-transitory computer-readable storage medium is provided. The non-transitory computer-readable storage medium is configured with instructions executable by one or more processors to cause the one or more processors to perform operations comprising: receiving, by a processor of a transaction platform, a payment request, wherein the payment request indicates that a protocol payment is performed for a current payment using a third-party payment account; initiating, by the processor of the transaction platform, if the third-party payment account is determined as having a risk, a security verification request to a third-party payment service party, to trigger a processor of the third-party payment service party to execute a security verification for the current payment to generate a security verification result; obtaining, by the processor of the transaction platform, the security verification result from the third-party payment service party; and executing, by the processor of the transaction platform, a current payment process for the current payment according to the security verification result.

The technical solutions provided in the embodiments of this specification may include the following beneficial effects.

In the embodiments of this specification, if a transaction platform side detects that a third-party payment account has a risk, a security verification request can be initiated to a third-party payment service party to trigger the third-party payment service party to execute a security verification for the current payment. A theft or fraud risk can be eliminated in the payment process by introducing an identity verification capability of a third-party payment service side in this embodiment. On one hand, the payment security can be ensured, and on the other hand, payment experience of a user can be ensured, and a payment success rate is improved.

It should be understood that the foregoing general description and detailed description in the following are merely exemplary and interpretive, but cannot constitute a limitation to this specification.

BRIEF DESCRIPTION OF THE DRAWINGS

The accompanying drawings herein, which are incorporated into the specification and constitute a part of this specification, illustrate embodiments consistent with this specification and, together with this specification, serve to explain the principles of this specification.

DETAILED DESCRIPTION

Figure 1A:
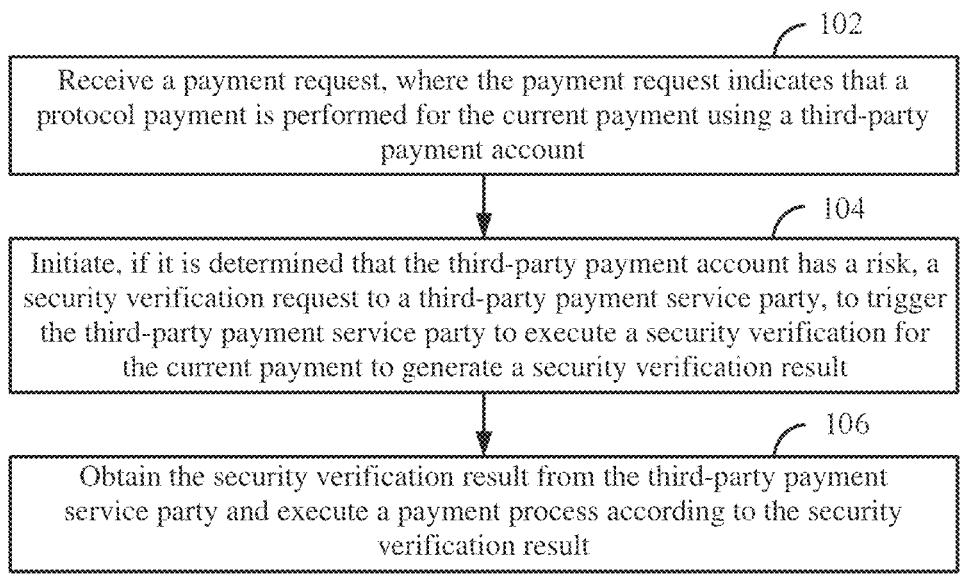
FIG. 1A is a flowchart of a payment processing method according to an embodiment of this specification.

Embodiments are described in detail herein, and some embodiments are shown in the accompanying drawings. When the following description involves the accompanying drawings, unless otherwise indicated, the same numerals in different accompanying drawings represent the same or similar elements. Implementations described in the following embodiments do not represent all of the embodiments in this specification. The implementations are merely examples of an apparatus or a method that is corresponds to some aspects of this specification described in detail in claims.

The terms used in this specification are merely for illustrating embodiments, and do not limit this specification. The terms "a," "said," and "the" of singular forms used in this specification and the appended claims include plural forms, unless otherwise specified in the context clearly. The term "and/or" used herein indicates and includes any or all possible combinations of one or more associated listed items.

The terms, such as "first," "second," and "third," may be used in this specification to describe various information. However, the information is not limited to these terms. These terms are merely used to distinguish between information of the same type. For example, without departing from the scope of this specification, the first information may also be referred to as the second information, and similarly, the second information may also be referred to as the first information. Depending on the context, for example, the word "if" used herein may be interpreted as "while" or "when," or "in response to determination."

In an e-commerce payment scenario, generally, an e-commerce transaction platform can introduce other third-party electronic wallets to enrich payment channels of a user. Therefore, when the user uses a transaction service of the e-commerce transaction platform, the user may select to use a third-party electronic wallet to perform the payment. To improve user experience, some network service-based transaction platforms introduce a withhold service (also referred to as a protocol payment), in which the user needs to bind a third-party electronic wallet account and a transaction platform account and signs a withhold agreement. When the user purchases a product or a service of the transaction platform, the transaction platform directly initiates a deduction request to the third-party electronic wallet to conduct the purchase, and the user does not need to input a password, thereby improving the user experience. For example, a transaction platform of an e-commerce company Lazada can access a Malaysian TnG wallet. Lazada and TnG may use a form of a protocol payment. The transaction platform may directly initiate a deduction request to the TnG wallet, and the TnG wallet may directly perform a deduction operation on a user account according to the deduction request, without a payment verification operation such as a payment password verification performed by the user during the payment.

In a payment scenario, a transaction platform is generally configured with a risk decision-making or a risk determination system, to determine whether the current payment has a risk, such as a theft or fraud risk. Since the verification on a payment password is not performed in the protocol payment scenario and a third-party electronic wallet is involved, if the transaction platform detects that the third-party electronic wallet has a risk, the transaction platform can directly intercept the payment to ensure the security. However, this manner affects payment experience of the user and may lead to loss of users/consumers. The transaction platform may also enable the current payment to pass the risk determination for the sake of payment experience. However, this manner introduces a certain risk and an actual risky payment may occur, resulting in losses to the platform or the user.

Based on this, an embodiment of this specification provides a method for processing risky payments (a payment processing method). On one hand, payment security can be ensured, and on the other hand, payment experience of the user can also be ensured, and a payment success rate is improved. The solution for processing risky payments relates to a processing method on a transaction platform or a transaction platform side of the network, and also relates to a processing method on a third-party payment product (that is, a third-party electronic wallet) or a third-party payment side of the network.

The payment processing method is first described from the perspective of the transaction platform side. FIG. 1A is a flowchart of a payment processing method for processing risky payments (e.g., payments have risks) according to an embodiment of this specification, and the method includes the following steps.

Step 102: Receiving a payment request, where the payment request indicates that a protocol payment is performed for a current payment using a third-party payment account.

Step 104: Initiating, if it is determined that the third-party payment account has a risk, a security verification request to a third-party payment service party, to trigger the third-party payment service party to execute a security verification for the current payment to generate a security verification result.

Step 106: Obtaining the security verification result from the third-party payment service party and executing a payment process according to the security verification result.

In this embodiment, the user may register a transaction account on the transaction platform side, and obtain, by using the transaction account, a transaction service provided by the transaction platform party. In addition, the user also registers an account (referred to as a third-party payment account in this embodiment) on the third-party payment service party side, and obtains, by using the account, a payment service provided by the third-party payment service party. There is a cooperation relationship between the transaction platform party and the third-party payment service party. A third-party payment wallet provided by the third-party payment service party can access transaction products of the transaction platform party. When the user uses products on the transaction platform side and needs to perform a payment, the user may select to use the third-party payment product to perform a payment operation. The third-party payment service party in this embodiment may use a protocol payment manner. Therefore, the user does not need to perform a payment verification such as a password or a biometric feature recognition on the third-party payment service party side during the payment.

In an actual application, the transaction platform party can receive a payment request in a plurality of manners. For example, the user may obtain a transaction service by using a client that is provided by the transaction platform party, and the client provides a transaction function and a payment function. In an embodiment, the client may provide a selection entry for payment manners. When the user performs the payment, the selection entry can be provided for the user to select to trigger one payment manner, and the client obtains a trigger operation of the user to determine the payment manner selected by the user. According to the trigger operation, it may be determined that the user selects a third-party payment manner with which the protocol payment is signed in advance, and the client may enable the payment request to carry information indicating that the protocol payment is performed for the current payment by using a third-party payment account, so that the transaction platform party can perform risk determination for the current payment after receiving the payment request.

In some embodiments, the transaction platform may provide a website, and the user may log onto a service page provided by the transaction platform using a browser. Similarly, the service page provides a transaction function and a payment function. When the user performs a payment, the service page may be provided for the user to select to trigger one of payment manners. The payment manner selected by the user is further determined by obtaining a trigger operation of the user. According to the trigger operation, it is determined that the user selects a third-party payment manner with which a protocol payment is signed in advance, and the service page may enable the payment request to carry information indicating that the protocol payment is performed for the current payment using a third-party payment account, so that the transaction platform party can perform risk determination for the current payment. In an actual application, the payment request may further carry other customized information such as transaction order related information, a transaction amount, or a transaction time, which is not limited in this embodiment.

The transaction platform side may be configured with a risk control system to determine, whether the current payment has a risk when the user initiates a payment. There may be a plurality of types of payment risks. For example, an account of the user on the transaction platform side is stolen, and in this case, the transaction platform party may execute a security verification on the user account. In an actual application, the payment risk may be that an account of the user on a third-party payment side is stolen, and in this case, the third-party payment service party performs a security verification on the user account as described in this embodiment.

Specifically, there may be a plurality of types of risk recognizable to the risk control system. In the payment scenario of this embodiment, two accounts of the user are involved: the transaction account on the transaction platform side and the payment account on the third-party payment side. A risk may be that the transaction account of the user on the transaction platform side is stolen, and a thief may log onto the transaction platform using the transaction account and perform a payment using the payment account associated with the transaction account. In this case, since the transaction account on the transaction platform side is involved, the transaction platform may execute a risk control and security verification on the transaction account. However, the risk may be that the payment account of the user on the third-party payment side is stolen, and the transaction platform has limited manners to execute the risk control and security verification for the third-party payment account. Therefore, in the solution of this embodiment, the transaction platform party may request the third-party payment service party to execute a security verification for the current payment behavior of the third-party payment account.

A risk determination procedure of the risk control system is not limited in this embodiment. In an embodiment, the risk control system may determine whether the third-party payment account is at a risk of being stolen in combination with a plurality of factors. For example, the risk control system may determine whether the third-party payment account is at the risk of being stolen according to historical features such as addresses, historical payment amounts, or historical payment frequency of the user in combination with addresses, amounts, and frequency of the latest N payments.

If it is determined that the third-party payment account has no risk, the transaction platform side may execute a protocol payment procedure to complete the current payment process. If it is determined that the third-party payment account has a risk, since an account of another service party is involved, to ensure the security, the transaction platform may inform the third-party payment service party and initiate a security verification request to the third-party payment service party, to trigger the third-party payment service party to execute the security verification for the current payment.

In an embodiment, the transaction platform party and the third-party payment service party may agree on invoking an interface. After the transaction platform party detects that the third-party payment account is at the risk of being stolen, the transaction platform party may invoke the interface to inform the third-party payment service party and initiate a security verification request to the third-party payment service party. The third-party payment service party executes a security verification procedure after receiving the security verification request.

Since the user performs a transaction payment when using a product on the transaction platform side, to ensure the fluency of user operations and reduce operation complexity, one manner is to perform the security verification in the product of the transaction platform side currently used by the user. Based on this, a security verification page of the third-party payment service party can be displayed in the product of the transaction platform side. The transaction platform side may obtain page link information of the third-party payment service party, and the page link information may include a page address or a uniform resource locator (URL) of the security verification page of the third-party payment service party. The URL address may be returned by the third-party payment service party to the transaction platform side after the interface is invoked, or may be provided to the transaction platform side by the third-party payment service party in advance. According to the page link information, the security verification page of the third-party payment service party may be directly accessed in the transaction platform, for the third-party payment service party to execute the security verification for the current payment through the security verification page. In an embodiment, the security verification page may be a page that conforms to implementation of HTML5 standards. In this embodiment, since the security verification page of the third-party payment service party may be directly displayed in the product of the transaction platform side, the user can perform a security verification conveniently, and this solution can improve user experience and improve payment processing efficiency.

In some embodiments, an application provided by the transaction platform and a payment application provided by the third-party payment side may be installed in a user equipment at the same time, or it is also possible to directly jump to a security verification page of a third-party payment application. The third-party payment application may be triggered for the third-party payment application to directly jump to the security verification page, to execute the security verification for the current payment through the security verification page.

The third-party payment service party may implement security verification in a plurality of manners. In an embodiment, the security verification may be implemented in a manner of verifying a payment password, and a payment password entry interface may be provided in the security verification page, for the user to enter a payment password to complete the verification. In some embodiments, the verification may be implemented by using a message one-time password (OTP). In some other embodiments, the security verification may be performed, but not limited to, through a biological feature recognition, for example, recognizing a fingerprint or a face of the user.

In this embodiment, to improve payment processing efficiency, when the transaction platform side invokes the interface to initiate a security verification request, the security verification request may carry payment information of the current payment. The payment information may include various types of information such as a user account, order-related information, a payment amount, and a payment address, for the third-party payment service party to trigger a deduction procedure by using the payment information after it is determined that the third-party payment account has no risk. In a case that security verification is required, in this embodiment, the payment information is added to the security verification request, for the third-party payment service party to trigger a deduction in time in a case that the verification succeeds, thereby improving payment processing efficiency and reducing a payment processing time.

Figure 1B:
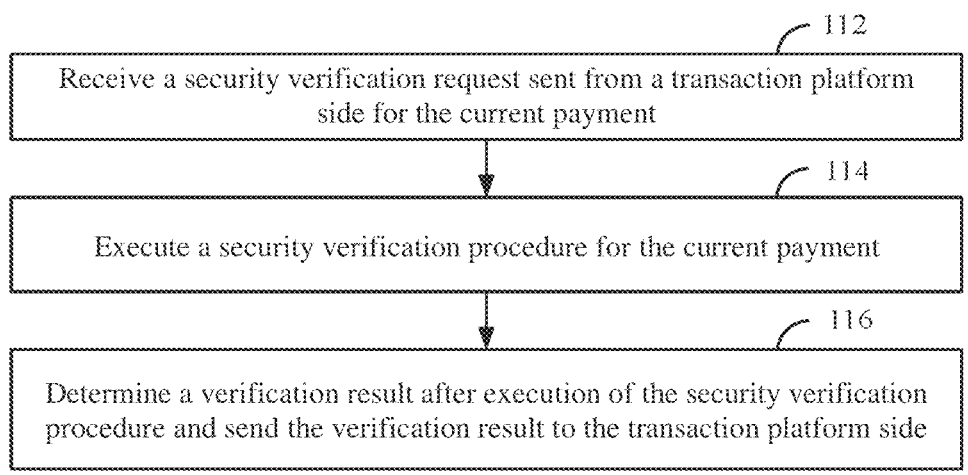
FIG. 1B is a flowchart of another payment processing method according to an embodiment of this specification.

The payment processing method is then described from a third-party payment product side. FIG. 1B is a flowchart of a payment processing method according to another embodiment of this specification, and the method includes the following steps.

Step 112: Receiving a security verification request sent from a transaction platform side for the current payment, where the security verification request is initiated by the transaction platform side after a user performs a protocol payment using a third-party payment account and determines that the third-party payment account has a risk.

Step 114: Executing a security verification procedure for the current payment.

Step 116: Determining a verification result after execution of the security verification procedure and sending the verification result to the transaction platform side.

This embodiment describes the payment processing procedure for processing risky payments from the third-party payment product side. Corresponding to the foregoing embodiment, after the security verification request initiated by the transaction platform side is received, a security verification procedure may be executed for the current payment. In an embodiment, the security verification may be implemented by verifying a payment password, and a payment password entry interface may be provided in the security verification page, for the user to enter a payment password to complete the verification. In some embodiments, verification may be implemented by using a message OTP. In some other embodiments, the security verification may be performed, but not limited to, through a biological feature recognition, for example, recognizing a fingerprint or a face of the user. After the execution of the payment verification procedure, a verification result is determined, and the verification result is sent to the transaction platform side, for the transaction platform side to execute a subsequent payment process.

Figure 2A:
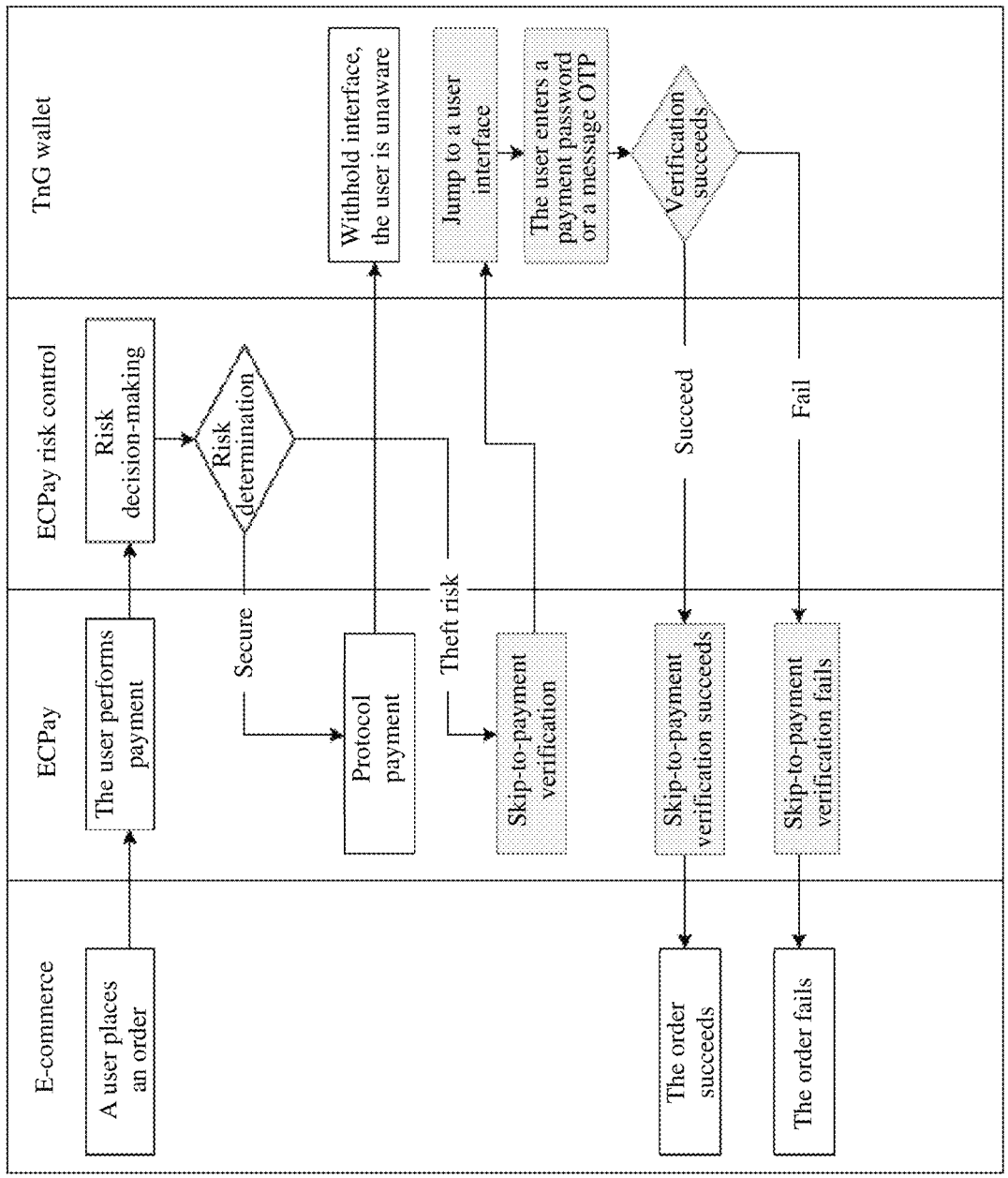
FIG. 2A is a flowchart of another payment processing method according to an embodiment of this specification.

The following describes a payment processing solution according to one embodiment of the specification. As shown in FIG. 2A, the solution of this embodiment involves an e-commerce transaction platform Lazada, a payment processing system ECPay configured by the transaction platform side, and a product on the third-party payment side including a TnG wallet. The Lazada may sign a protocol payment with the TnG wallet, that is, the Lazada directly initiates a deduction request to the TnG, and the TnG directly executes a deduction operation according to the deduction request, while a payment verification operation such as entering a password by the user is not required during the deduction. Such a protocol payment does not require the TnG on the third-party payment side to execute the payment verification. This embodiment provides a payment processing solution that ensures the payment security in a case that a risk transaction occurs.

In this embodiment, the transaction platform Lazada processes payments of the user using the ECPay payment system. After the user trades on the transaction platform side and initiates a payment request, the ECPay payment system invokes an ECPay risk control system to perform risk determination. If the ECPay risk control system detects that the current payment is secure, a decision for a protocol payment is outputted, and the ECPay payment system triggers a protocol payment procedure to complete the current payment process. If the ECPay risk control system detects that a TnG account is at a risk of being stolen, a decision for a security verification is outputted.

Figure 2B:
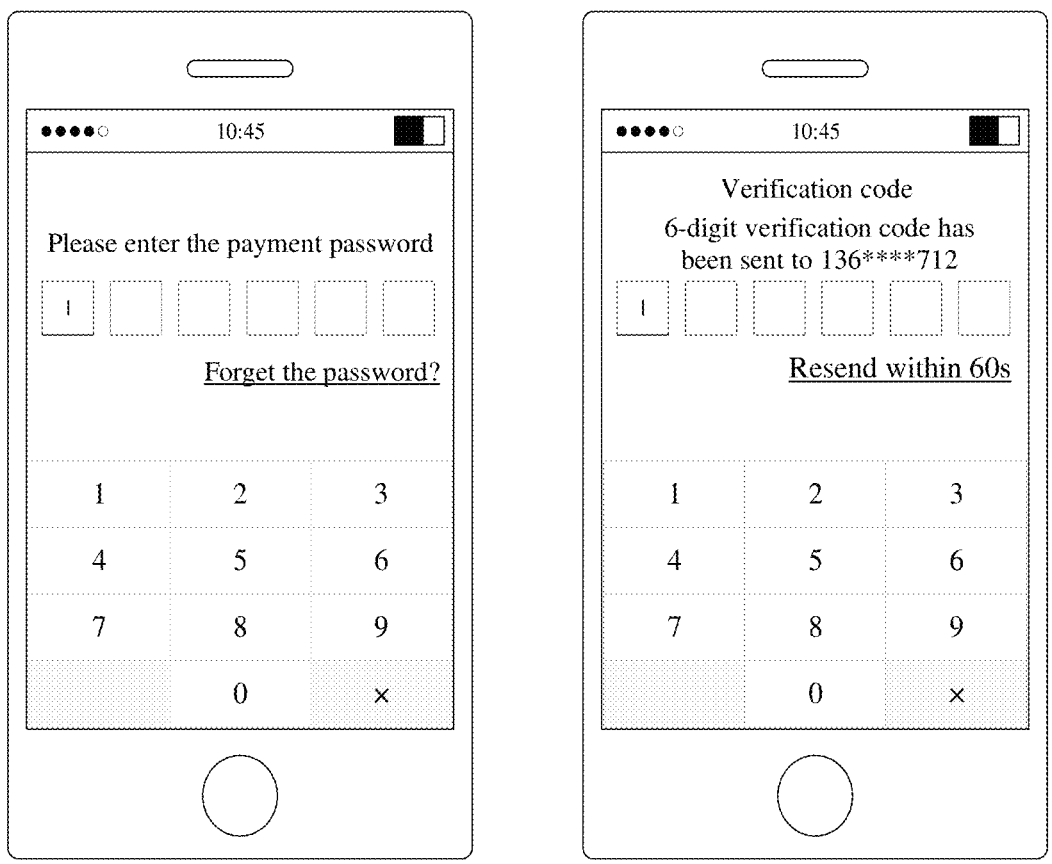
FIG. 2B is a schematic diagram of application pages according to an embodiment of this specification.

After receiving the decision for a security verification, by skipping or jumping to a payment verification, the ECPay payment system may request the TnG to perform a security verification for the current payment. In an embodiment, the Lazada side may invoke a security verification interface provided by the TnG side, to directly jump to a security verification page on the TnG side from a product on the Lazada side. FIG. 2B is a schematic diagram of a security verification page according to an embodiment of this specification. In this page, the user may enter a payment password or a message OTP, for the TnG wallet to execute a security verification, and if the security verification succeeds, the TnG wallet executes a deduction procedure, and the payment for a Lazada order succeeds. If the security verification fails, the TnG wallet informs the Lazada side of the verification failure, and the payment for the order on the Lazada side fails.

In this embodiment, when payment is performed by using the TnG wallet in an e-commerce scenario, if a conventional solution supports the protocol payment, after detecting that the third-party payment account is at the risk of being stolen, the ECPay system generally intercepts the transaction or allows the transaction. In this embodiment, after the decision of jumping to a payment verification is introduced, an identity verification capability of the TnG may be used to eliminate a theft risk of the TnG. A payment success rate of the Lazada orders and payment experience of the user are both greatly increased. Generally, a plurality of third-party payment products are provided in the e-commerce scenario, and a theft risk can be eliminated by using the identity verification capability of the third-party payment service party in the solution of this embodiment. Payment experience of the user can be improved and a payment success rate is improved while the risk is controllable.

Corresponding to the embodiments of the foregoing payment processing method, this specification further provides embodiments of a payment processing apparatus and a terminal to which the apparatus is applied.

Figure 3:
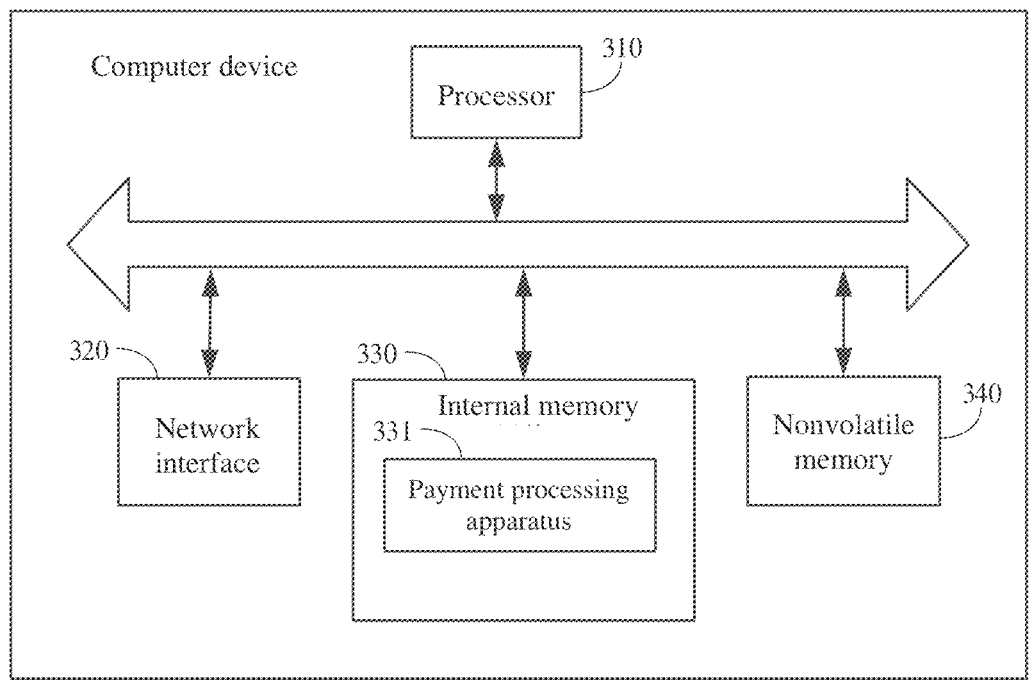
FIG. 3 is a block diagram of a device in which a payment processing apparatus is disposed according to an embodiment of this specification is located.

The embodiment of the payment processing apparatus in this specification may be applied to a computer device, such as a server or a terminal device. The device embodiments may be implemented by using software, hardware, or a combination of software and hardware. Taking software implementation as an example, an apparatus is formed by reading corresponding computer program instructions in a nonvolatile memory into an internal memory for execution by a file processing processor in which the apparatus resides. On a hardware level, as shown in FIG. 3, which is a hardware structural diagram of a computer device in which a payment processing apparatus according to this specification is located, in addition to one or more processors (e.g., a processor 310), a memory 330, a network interface 320, and a nonvolatile memory 340 shown in FIG. 3, the server or the electronic device in which the apparatus 331 is located in this embodiment may usually further include other hardware according to actual functions of the computer device. Details are not described herein.

Figure 4:
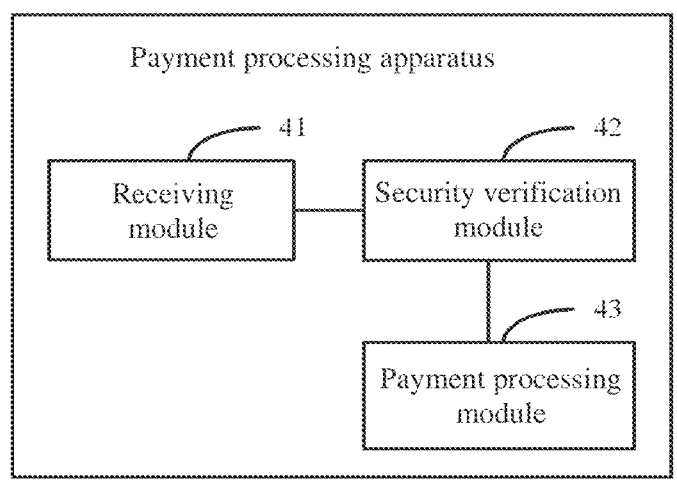
FIG. 4 is a block diagram of a payment processing apparatus according to an embodiment of this specification.

As shown in FIG. 4, FIG. 4 is a block diagram of a payment processing apparatus according to an embodiment of this specification, and the apparatus includes:

a receiving module 41, configured to receive a payment request, where the payment request indicates that a protocol payment is performed for current payment using a third-party payment account;

a security verification module 42, configured to initiate, if it is determined that the third-party payment account has a risk, a security verification request to a third-party payment service party, to trigger the third-party payment service party to execute a security verification for the current payment to generate a security verification result; and a payment processing module 43, configured to obtain a security verification result of the third-party payment service party and execute a payment process according to the security verification result.

In an embodiment, the payment processing module is further configured to:

execute a protocol payment procedure to complete the current payment process if it is determined that the third-party payment account has no risk.

In an embodiment, the security verification request carries payment information of the current payment, for the third-party payment service party to trigger a deduction procedure using the payment information after it is determined that the third-party payment account has no risk.

In an embodiment, the payment processing module is further configured to:

prohibit the current payment if the security verification result indicates that the security verification for the current payment fails.

In an embodiment, the security verification module is further configured to:

invoke a security verification interface provided by the third-party payment service party, obtain page link information of the third-party payment service party, and access a security verification page of the third-party payment service party according to the page link information, for the third-party payment service party to execute a security verification for the current payment through the security verification page.

In an embodiment, the security verification module is further configured to:

trigger to start a third-party payment application, for the third-party payment application to jump to a security verification page and execute the security verification for the current payment through the security verification page.

Figure 5:
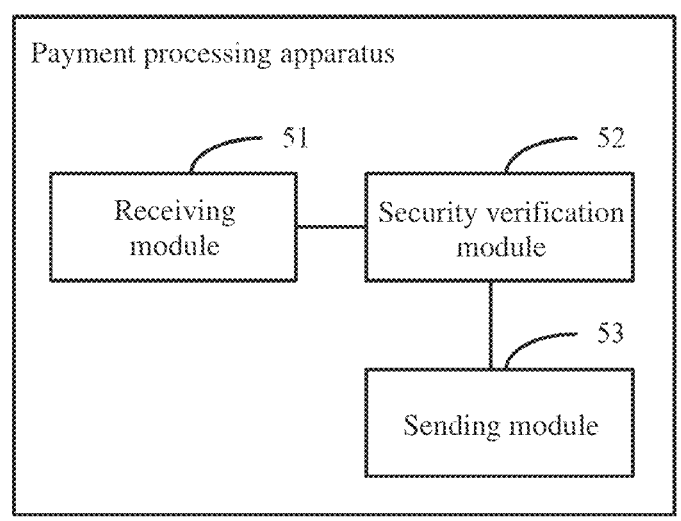
FIG. 5 is a block diagram of another payment processing apparatus according to an embodiment of this specification.

As shown in FIG. 5, FIG. 5 is a block diagram of a payment processing apparatus according to an embodiment of this specification, and the apparatus includes:

a receiving module 51, configured to receive a security verification request sent from a transaction platform side for a current payment, where the security verification request is initiated by the transaction platform side after a user performs a protocol payment using a third-party payment account and determines that the third-party payment account has a risk;

a security verification module 52, configured to execute a security verification procedure; and a sending module 53, configured to determine a verification result after execution of the security verification procedure and send the verification result to the transaction platform side.

Correspondingly, embodiments of this specification further provide a computer device, including a memory, one or more processors including a processor of the transaction platform and a processor of the third-party payment service party, and a computer program stored in the memory and executable on the processor, where the processor executes the program to implement the embodiment of the payment processing method.

For details about the implementation processes of the functions and effects of the modules in the foregoing payment processing apparatus, refer to the implementation processes of the corresponding steps in the foregoing payment processing method. Details are not described herein again.

Because the apparatus embodiments basically correspond to the method embodiments, for related parts, reference may be made to the descriptions in the method embodiments. The described apparatus embodiment is merely an example. The modules described as separate parts may or may not be physically separated, and parts displayed as modules may or may not be physical modules. They may be located in one position, or may be distributed on a plurality of network modules. Some or all of the modules may be selected according to actual requirements to achieve the objectives of the solutions of the present specification. A person of ordinary skill in the art may understand and implement the embodiments without creative efforts.

Embodiments of this specification are described above. Other embodiments fall within the scope of the appended claims. In some embodiments, the actions or steps recorded in the claims may be performed in sequences different from those in the embodiments, and an expected result may still be achieved. In addition, the processes depicted in the accompanying drawings are not necessarily performed in the specific order or successively to achieve an expected result. In some implementations, multitasking and parallel processing may be feasible or beneficial.

After considering this specification and practicing this application, a person of ordinary skill in the art can easily conceive other implementations of this specification. This specification covers any variation, use, or adaptive change of this specification following the general principles thereof, and include well-known knowledge and conventional technical means in the technical field that are not disclosed in this specification. This specification and embodiments be considered as examples only. A true scope and spirit of this specification are indicated by the following claims.

It will be appreciated that this specification is not limited to the exact construction that has been described above and illustrated in the accompanying drawings, and that various modifications and changes can be made without departing from the scope thereof. The scope of this specification only be limited by the appended claims.

The foregoing descriptions are merely some embodiments of this specification, and this specification is not limited to those embodiments. Any modification, equivalent replacement, or improvement made without departing from the spirit and principle of this specification shall fall within the protection scope of this specification.

What is claimed is:

1. A method for processing risky payments, comprising:
    receiving, by a transaction platform, a payment request, wherein the payment request indicates that a protocol payment is requested for a current payment using a third-party payment account;
    determining, by the transaction platform, whether the third-party payment account has a risk according to the payment request; and
    in response to determining that the third-party payment account has no risk, executing, by the transaction platform, a protocol payment procedure for the current payment, and in response to determining that the third-party payment account has a risk:
        initiating, by the transaction platform, a security verification request to a third-party payment service party, to trigger the third-party payment service party to execute a security verification for the current payment to generate a security verification result indicating whether the third-party payment account has a risk;
        obtaining, by the transaction platform, the security verification result from the third-party payment service party; and
        in response to the security verification result indicating that the third-party payment account has no risk, executing, by the transaction platform, the protocol payment procedure for the current payment, and
        in response to the security verification result indicating that the third-party payment account has a risk, prohibiting, by the transaction platform, the protocol payment procedure to be executed.

2. The method according to claim 1,
    wherein the security verification request carries payment information of the current payment, and
    wherein in response to the security verification result indicating that the third-party payment account has no risk, executing, by the transaction platform, the protocol payment procedure for the current payment comprises: triggering the third-party payment service party to perform a deduction procedure using the payment information.

3. The method according to claim 1, wherein in response to determining that the third-party payment account has a risk, the initiating, by the transaction platform, a security verification request to a third-party payment service party, to trigger the third-party payment service party to execute a security verification for the current payment to generate a security verification result indicating whether the third-party payment account has a risk comprises:
    invoking, by the transaction platform, a security verification interface provided by the third-party payment service party, obtaining page link information of the third-party payment service party, and accessing a security verification page of the third-party payment service party according to the page link information, for the third-party payment service party to execute the security verification for the current payment through the security verification page.

4. The method according to claim 1, wherein in response to determining that the third-party payment account has a risk, the initiating, by the transaction platform, a security verification request to a third-party payment service party, to trigger the third-party payment service party to execute a security verification for the current payment to generate a security verification result indicating whether the third-party payment account has a risk comprises:
    triggering, by the transaction platform, a third-party payment application, for the third-party payment application to jump to a security verification page and to execute the security verification for the current payment through the security verification page.

5. The method according to claim 1, further comprising:
    in response to determining that the third-party payment account has a risk, receiving, by the third-party payment service party, the security verification request sent from the transaction platform for the current payment, wherein the security verification request is initiated by the transaction platform after the user requesting the protocol payment for the current payment using the third-party payment account;
    executing, by the third-party payment service party, the security verification for the current payment; and
    generating, by the third-party payment service party, the security verification result after execution of the security verification, and sending the security verification result to the transaction platform.

6. A payment processing system, comprising one or more processors and a non-transitory computer-readable storage medium storing instructions executable by the one or more processors to cause the system to perform operations comprising:
    receiving, by a processor of a transaction platform, a payment request, wherein the payment request indicates that a protocol payment is requested for a current payment using a third-party payment account;
    determining, by the processor of the transaction platform, whether the third-party payment account has a risk according to the payment request; and
    in response to determining that the third-party payment account has no risk, executing, by the processor of the transaction platform, a protocol payment procedure for the current payment, and
    in response to determining that the third-party payment account has a risk;
        initiating, by the processor of the transaction platform, a security verification request to a third-party payment service party, to trigger a processor of the third-party payment service party to execute a security verification for the current payment to generate a security verification result indicating whether the third-party payment account has a risk;
        obtaining, by the processor of the transaction platform, the security verification result from the third-party payment service party; and
        in response to the security verification result indicating that the third-party payment account has no risk, executing, by the processor of the transaction platform, the protocol payment procedure for the current payment, and
        in response to the security verification result indicating that the third-party payment account has a risk, prohibiting, by the processor of the transaction platform, the protocol payment procedure to be executed.

7. The system according to claim 6,
wherein the security verification request carries payment information of the current payment, and
wherein in response to the security verification result indicating that the third-party payment account has no risk, executing, by the processor of the transaction platform, the protocol payment procedure for the current payment comprises: triggering the processor of the third-party payment service party to perform a deduction procedure using the payment information.

8. The system according to claim 6, wherein in response to determining that the third-party payment account has a risk, the initiating, by the processor of the transaction platform, a security verification request to a third-party payment service party, to trigger a processor of the third-party payment service party to execute a security verification for the current payment to generate a security verification result indicating whether the third-party payment account has a risk comprises:
invoking, by the processor of the transaction platform, a security verification interface provided by the third-party payment service party, obtaining page link information of the third-party payment service party, and accessing a security verification page of the third-party payment service party according to the page link information, for the processor of the third-party payment service party to execute the security verification for the current payment through the security verification page.

9. The system according to claim 6, wherein in response to determining that the third-party payment account has a risk, the initiating, by the processor of the transaction platform, a security verification request to a third-party payment service party, to trigger a processor of the third-party payment service party to execute a security verification for the current payment to generate a security verification result indicating whether the third-party payment account has a risk comprises:
triggering, by the processor of the transaction platform, a third-party payment application, for the third-party payment application to jump to a security verification page and to execute the security verification for the current payment through the security verification page.

10. The system according to claim 6, wherein the operations further comprise:
in response to determining that the third-party payment account has a risk, receiving, by a processor of the third-party payment service party, the security verification request sent from the transaction platform for the current payment, wherein the security verification request is initiated by the transaction platform after the user requesting the protocol payment for the current payment using the third-party payment account;
executing, by the processor of the third-party payment service party, the security verification for the current payment; and
generating, by the processor of the third-party payment service party, the security verification result after execution of the security verification, and sending the security verification result to the transaction platform.

11. A non-transitory computer-readable storage medium, configured with instructions executable by one or more processors to cause the one or more processors to perform operations comprising:
receiving, by a processor of a transaction platform, a payment request, wherein the payment request indicates that a protocol payment is requested for a current payment using a third-party payment account;
determining, by the processor of the transaction platform, whether the third-party payment account has a risk according to the payment request; and
in response to determining that the third-party payment account has no risk, executing, by the processor of the transaction platform, a protocol payment procedure for the current payment, and
in response to determining that the third-party payment account has a risk:
initiating, by the processor of the transaction platform, a security verification request to a third-party payment service party, to trigger a processor of the third-party payment service party to execute a security verification for the current payment to generate a security verification result indicating whether the third-party payment account has a risk;
obtaining, by the processor of the transaction platform, the security verification result from the third-party payment service party; and
in response to the security verification result indicating that the third-party payment account has no risk, executing, by the processor of the transaction platform, the protocol payment procedure for the current payment, and
in response to the security verification result indicating that the third-party payment account has a risk, prohibiting, by the processor of the transaction platform, the protocol payment procedure to be executed.

12. The non-transitory computer-readable storage medium according to claim 11,
wherein the security verification request carries payment information of the current payment, and
wherein in response to the security verification result indicating that the third-party payment account has no risk, executing, by the processor of the transaction platform, the protocol payment procedure for the current payment comprises: triggering the processor of the third-party payment service party to perform a deduction procedure using the payment information.

13. The non-transitory computer-readable storage medium according to claim 11, wherein in response to determining that the third-party payment account has a risk, the initiating, by the processor of the transaction platform, a security verification request to a third-party payment service party, to trigger a processor of the third-party payment service party to execute a security verification for the current payment to generate a security verification result indicating whether the third-party payment account has a risk comprises:
invoking, by the processor of the transaction platform, a security verification interface provided by the third-party payment service party, obtaining page link information of the third-party payment service party, and accessing a security verification page of the third-party payment service party according to the page link information, for the processor of the third-party payment service party to execute the security verification for the current payment through the security verification page.

14. The non-transitory computer-readable storage medium according to claim 11, wherein in response to determining that the third-party payment account has a risk, the initiating, by the processor of the transaction platform, a security verification request to a third-party payment service party, to trigger a processor of the third-party payment service party to execute a security verification for the current payment to generate a security verification result indicating whether the third-party payment account has a risk comprises:

triggering, by the processor of the transaction platform, a third-party payment application, for the third-party payment application to jump to a security verification page and to execute the security verification for the current payment through the security verification page.

\* \* \* \* \*